Oct. 20, 1931.  F. YARDLEY  1,828,697

CHECK VALVE STRUCTURE

Filed Oct. 5, 1929

Inventor
Farnham Yardley
By Miller & Bunn
Attorneys

Patented Oct. 20, 1931

1,828,697

UNITED STATES PATENT OFFICE

FARNHAM YARDLEY, OF WEST ORANGE, NEW JERSEY, ASSIGNOR TO JENKINS BROS., OF NEW YORK, N. Y., A CORPORATION OF NEW JERSEY

CHECK VALVE STRUCTURE

Application filed October 5, 1929. Serial No. 397,685.

This invention relates to a novel form of check valve to insure the complete closure of the disk member of the valve against its seat and prevent the seepage of liquids and gases through the valve, to which end the structure comprises a valve casing with a transverse partition having a seat opening for the disk member, the latter being provided with the usual guides or feathers on its lower face which cooperate with the seat opening to assist in guiding the valve, and a stem on its upper face which engages an opening in a floating guide, which is held in position by the usual valve spring which forces the floating guide against a flange on the casing, the floating guide being susceptible of lateral movement within the casing.

The invention is illustrated in the accompanying drawings, in which:—

Figure 1:
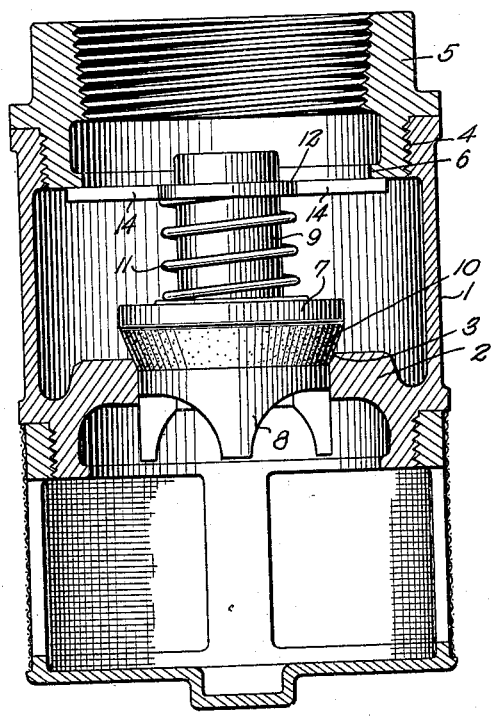
Fig. 1 is a sectional elevation of a typical foot valve.
Figure 2:
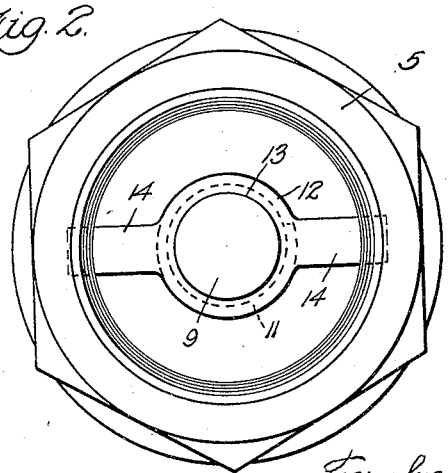
Fig. 2 is a plan view thereof.

While the present invention is especially applicable to the construction of foot valves for pumps for raising and measuring gasoline, kerosene, benzine, and similar fluids which readily escape through minute openings, it is also adapted to general use as a check valve for fluids of all kinds and descriptions wherever a complete closure of the valve against its seat is essential or desirable.

In the drawings, 1 indicates the main portion of the shell or casing of the valve, which is usually substantially cylindrical and is provided with a transverse partition 2 having formed therein the valve seat opening 3, the upper peripheral edge of which is usually beveled to form the valve seat proper. The upper end of the casing is internally screw threaded to receive a coupling ring 5, the upper portion of which is internally screw threaded and the lower portion externally screw threaded to engage the threads on the casing, the inner portion of the ring terminating in a flange 6. The valve disk member comprises a body portion 7 having guide lugs or feathers 8 on its lower portion, which engage the seat opening and serve as the bottom guide for the disk member. The body portion is fitted with a seating ring 10, which may be of any suitable composition and is generally frusto-conical in exterior contour to conform to the conical valve seat. The upper face of the valve disk is provided with a central stem or extension 9, which is surrounded by a helical spring 11, the function of which is to hold the disk firmly in engagement with the seat. In valves of this type, as heretofore constructed, it was customary to provide the casing with a guide spider for the stem, either formed as an integral part of the casing or as a separate member fitted into the casing, to cooperate with the lower guiding means consisting of the feathers and the wall of the seat opening to hold the valve in rigid axial alignment under all conditions, for which reason the guide spider was substantially immovable within the casing during the operation of the valve. Check valves of this description have been ineffective, when employed in apparatus containing or handling fluids which readily pass through small apertures, for the reason that very small particles of foreign matter lodging between the valve disk and its seat or any imperfections in the engaging portions of the disk and the seat would prevent the complete closure of the valve against its seat, because of the rigidity of the upper and lower guides for the valve disk, as any projection on the seat or on the engaging portion of the disk would necessarily prevent the disk properly engaging the seat to prevent the fluids escaping between the disk and its seat.

The present invention, as stated, is designed to insure the proper sealing engagement of the disk with the seat, when the valve is in closed position. This desirable result is obtained by providing the stem member 9 with a floating guide 12, which is provided with a central opening closely fitting the stem and with lateral extensions 14, which engage abutments on the casing, or, as shown, with the flange 6 of the coupling ring 5, so that the guide plate is capable of considerable lateral movement relative to the longitudinal axis of the valve disk. It will be seen, therefore, that the floating guide member serves primarily to guide the valve disk or head in its movements and to permit the disk to adjust itself to any necessary position to insure a sealing fit with its seat, due to the fact that the guide plate is capable of lateral movement with respect to the annular rim 13, which it abuts.

Instead of the particular form of plate shown, the latter may be in the form of a spider, a properly apertured disk, or any other suitable shape, provided it will permit the free flow of the liquid and is of less diameter than the interior of the valve casing, so that it is capable of a limited movement transversely of the longitudinal axis of the valve disk, but is of greater diameter than the shoulder or abutment on the valve casing with which it engages.

What I claim is:—

A check valve structure comprising a casing having a transverse wall with a valve seat opening therein and a removable top section, a valve disk member having guide feathers on its bottom cooperating with the seat opening and a stem on its top, a spring surrounding the stem, and a guide plate having a central opening engaged by the stem and lateral members held in engagement with the top section by said spring, said plate being shorter than the internal diameter of the casing to permit limited movement of the plate transversely of the axis of the valve disk.

In testimony whereof I affix my signature.

FARNHAM YARDLEY.